(12) United States Patent  (10) Patent No.: US 7,692,726 B1
Greenberg  (45) Date of Patent: Apr. 6, 2010

(54) VIDEO DECODER WITH INTEGRATED AUDIO IF DEMODULATION

(75) Inventor: Robert Y. Greenberg, Portland, OR (US)

(73) Assignee: Pixelworks, Inc., Tualatin, OR (US)

( * ) Notice: Subject to any disclaimer, the term of this patent is extended or adjusted under 35 U.S.C. 154(b) by 964 days.

(21) Appl. No.: 11/131,558

(22) Filed: May 17, 2005

(51) Int. Cl.
H04N 5/44 (2006.01)

(52) U.S. Cl. ............... 348/725; 348/678; 348/726; 348/738

(58) Field of Classification Search ............ 348/738, 348/725–726, 678, 731, 705–706, 707, 553–555; 455/3.2, 3.1, 6.3; 725/38, 70, 127; H04N 5/44
See application file for complete search history.

(56) References Cited

U.S. PATENT DOCUMENTS

| | | | | |
|---|---|---|---|---|
| 5,640,670 A | * | 6/1997 | Samueli et al. ............... 725/70 |
| 6,147,713 A | * | 11/2000 | Robbins et al. ............. 348/555 |
| 6,476,878 B1 | * | 11/2002 | Lafay et al. ................. 348/738 |
| 6,678,011 B2 | * | 1/2004 | Yanagi et al. ............... 348/725 |
| 7,039,941 B1 | * | 5/2006 | Caporizzo et al. ........... 725/127 |
| 7,352,411 B2 | * | 4/2008 | Jaffe .......................... 348/726 |

* cited by examiner

*Primary Examiner*—Trang U Tran
(74) *Attorney, Agent, or Firm*—Marger Johnson & McCollom, P.C.

(57) ABSTRACT

An embodiment may include a method to convert a video signal with an analog to digital converter in a video decoder, convert an audio signal with the analog to digital converter, demodulate the audio signal with an audio demodulator and amplify the audio signal with a programmable gain amplifier before it is converted in the analog to digital converter. In an embodiment the programmable gain amplifier may receive a control signal from the audio demodulator to adjust the audio signal level. Another embodiment may provide a video decoder comprising a programmable gain controller, an analog to digital converter coupled with the programmable gain controller, the converter to digitize audio and video information, and an audio demodulator coupled with the analog to digital converter, the audio demodulator to control the programmable gain controller for an audio signal.

21 Claims, 7 Drawing Sheets

VIDEO DECODER WITH INTEGRATED AUDIO IF DEMODULATION

BACKGROUND

Signal processing improvements track integrated circuit (IC) development. As ICs have become less expensive and more powerful, signal processing, particularly digital signal processing, has taken off. As a result, signals conventionally processed in the analog domain are processed in the digital domain. This shift of processing into the digital domain improves signal quality, reduces cost and increases signal processing capability in general.

Video signals often have an associated audio component. For example, TV tuners may output a video and an audio signal, such as composite video (CVBS) and a second intermediate frequency for audio (SIF). The signal characteristics of audio and video signals may differ considerably.

Video and audio data is conventionally processed with separate hardware. In the present example, a CVBS signal is sent to a video decoder and an SIF signal is sent to surface acoustic wave (SAW) filters and an audio intermediate frequency (IF) demodulator. It is desirable to have a decoder that can handle both video and audio signals like CVBS and SIF. It is also desirable to eliminate the SAW filters.

SUMMARY

An embodiment may include a method to convert a video signal with an analog to digital converter in a video decoder, convert an audio signal with the analog to digital converter, demodulate the audio signal with an audio demodulator and amplify the audio signal with a programmable gain amplifier before it is converted in the analog to digital converter. In an embodiment the programmable gain amplifier may receive a control signal from the audio demodulator to adjust the audio signal level.

An embodiment may provide an article of machine-readable medium containing instructions that perform the embodiment method.

Another embodiment may provide a video decoder comprising a programmable gain controller, an analog to digital converter coupled with the programmable gain controller, the converter to digitize audio and video information, and an audio demodulator coupled with the analog to digital converter, the audio demodulator to control the programmable gain controller for an audio signal.

BRIEF DESCRIPTION OF THE DRAWINGS

We describe embodiments referencing the following drawings.

DETAILED DESCRIPTION

In the following description, numerous specific details are set forth. It is understood, however, that embodiments of this disclosure may be practiced without these specific details. In other instances, well-known circuits, structures, and techniques have not been shown in detail in order to not obscure the understanding of this description.

Reference in the specification to "one embodiment" or "an embodiment", and the like, means that a particular feature, structure, or characteristic described in connection with the embodiment is included in at least one aspect of the disclosure. The appearances of the phrase "in one embodiment" in various places in the specification do not necessarily all refer to the same embodiment.

Computing and processing advancements provide myriad benefits. For example, manufacturing and design improvements allow higher levels of integration in ICs, thus integrating functions previously distributed over more hardware. In another example, digital technologies are increasingly implemented in traditionally analog areas. By converting an analog signal to a digital signal, it can be processed without losing quality. The combination of higher levels of integration and the increase of processing in the digital domain provides electronics with more functionality at a lower cost.

In an embodiment, hardware may be re-used for audio and video signals. For example, an analog to digital converter (ADC) may be used to digitize a video signal and also used to digitize an audio signal. In some cases the audio and video signals may have different signal levels, amplitudes, etc., and may need to be adjusted before being input to an ADC. A programmable gain amplifier/controller (PGA/PGC) may adjust an analog signal before it is input to the ADC, and may receive control information from a demodulator or other downstream hardware from the ADC. In one embodiment, the audio demodulator has a feedback control to the PGA/PGC and adjusts the signal level prior to the signal being digitized in the ADC.

An embodiment may use existing video ADCs for SIF decoding and eliminate the need for separate ADCs to handle the SIF. This saves silicon area, lowers cost, and reduces power consumption. By using a high performance ADC to directly digitize the SIF, SAW filters can be eliminated, saving circuit board area and reducing cost.

Embodiments may utilize a video decoder having multiple ADCs. For example, video decoders typically have three ADCs to handle component video. An example component video is YPbPr, which consists of a luminance signal (Y) comprising red, green and blue luminance values; a Pb signal which is a weighted difference of a blue signal and the luminance signal; and a Pr signal which is a weighted difference of a red signal and the luminance signal. A video signal may be divided into other components than those listed above and thus may require a different amount of ADCs.

In an embodiment, if a tuner provides a CVBS signal, only one ADC is needed to digitize the CVBS signal, allowing another available but otherwise unused ADC to digitize an SIF signal. To do so, a proper type of PGA/PGC to output to an ADC and an ADC that has high enough performance to digitize the SIF signals may be included. An embodiment may provide a feedback loop from an audio demodulator to a PGA/PGC while re-using a video ADC for audio ADC.

Figure 1:
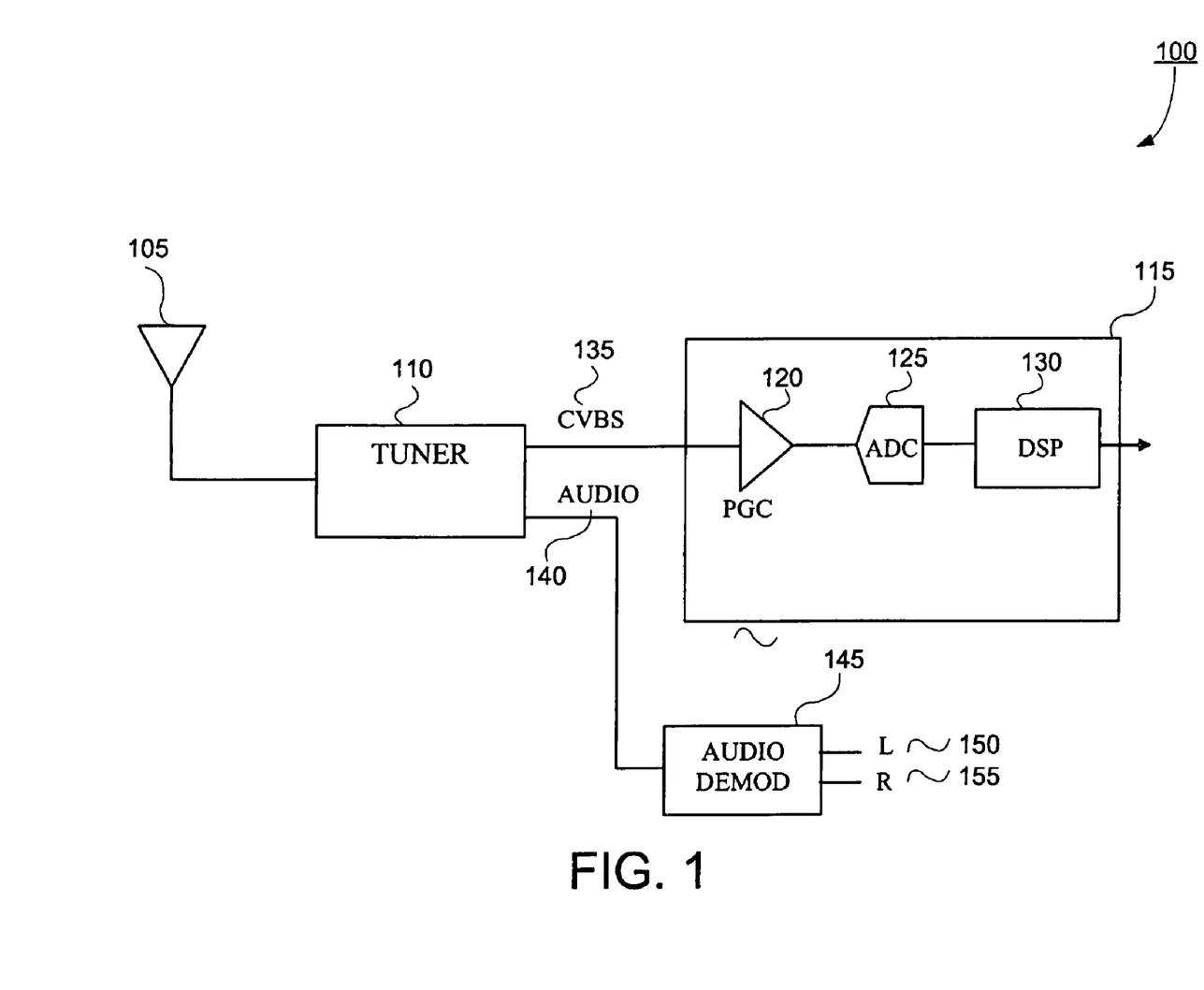
FIG. 1 illustrates a video decoder with separate audio and video processing.

FIG. 1 illustrates a conventional video decoder with separate audio and video processing of a composite video signal.

In this example, tuner 110 receives an audio/video signal from antenna 105, and the tuner 110 outputs a composite video signal 135 to video decoder 115 and an audio signal 140 to audio demodulator 145.

Video decoder 115 includes a programmable gain controller/amplifier 120, an analog to digital converter 125, and digital signal processing circuitry 130. The programmable gain controller/amplifier 120 provides signal level adjustment to compensate for different signal levels. The ADC 125 digitizes the analog signal received from PGC 120 and outputs the digital signal to DSP circuitry 130.

Audio demodulator 145 receives audio signal 140 from tuner 110 and demodulates it. In FIG. 1 the audio demodulator 145 then separates the audio signal into audio signals for a left channel 150 and a right channel 155.

Figure 2:
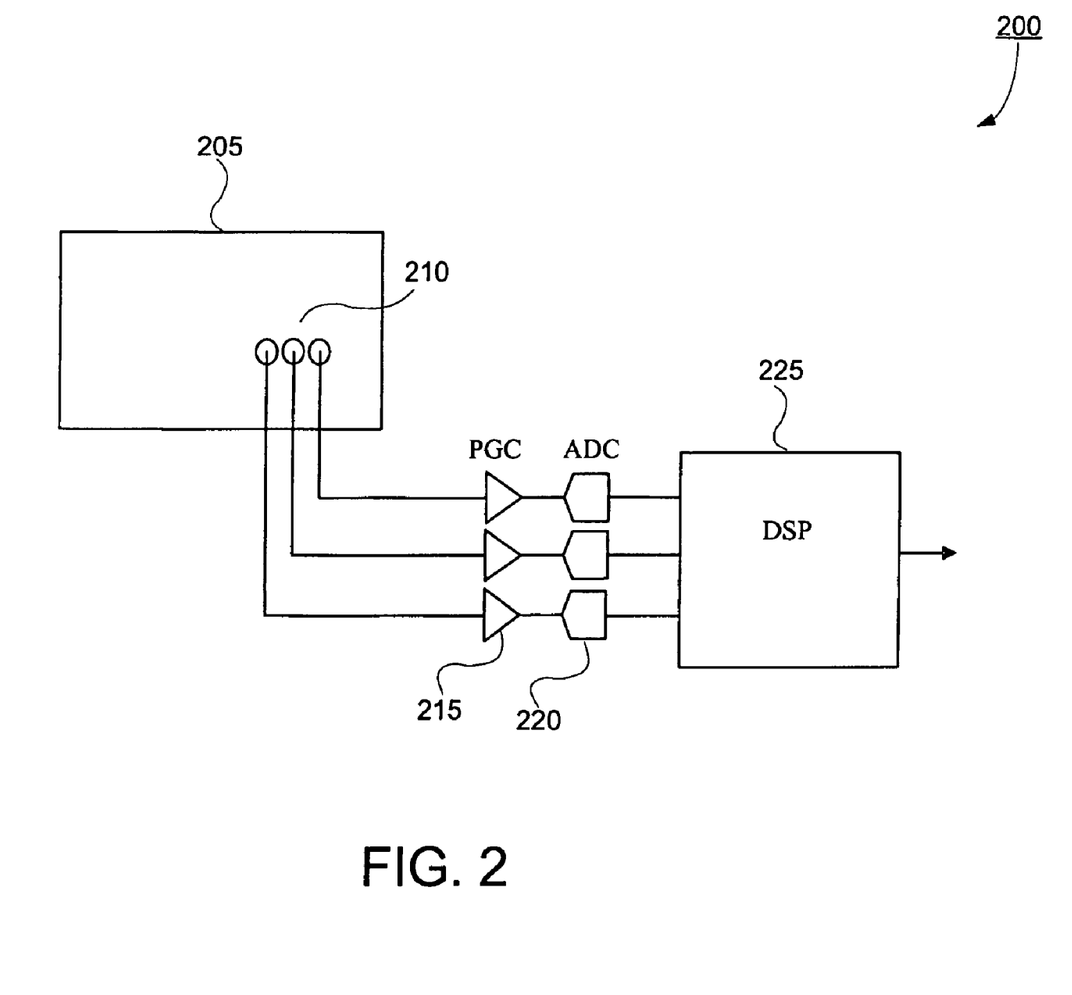
FIG. 2 illustrates a component video signal being converted from analog to digital.

FIG. 2 illustrates a conventional component video signal being converted from an analog signal to a digital signal. A device 205 may output three signals at output 210. Example devices for block 205 include a personal computer, a set-top box, a DVD player, VCR, etc. In this example the three signals may be a component video such as YPbPr. Other types of component video come within the scope of this disclosure. Device 205 may still have a composite video coming out but here only the higher quality component video is illustrated. Component video signals provide a better picture than composite video signals because the video signal is spread over three wires, however, these extra wires each require supporting hardware.

In FIG. 2, the component video signal is processed by front end processing that is essentially the same as programmable gain controller/amplifier 120 and analog to digital converter 125 in FIG. 1, but each path must have this hardware as represented with PGCs 215 and ADCs 220. After the component signals pass through PGCs 215 and ADCs 220, they are input to DSP circuitry 225. The component video signal processing circuitry shown in FIG. 2 processes only a video signal without an audio counterpart.

Figure 3:
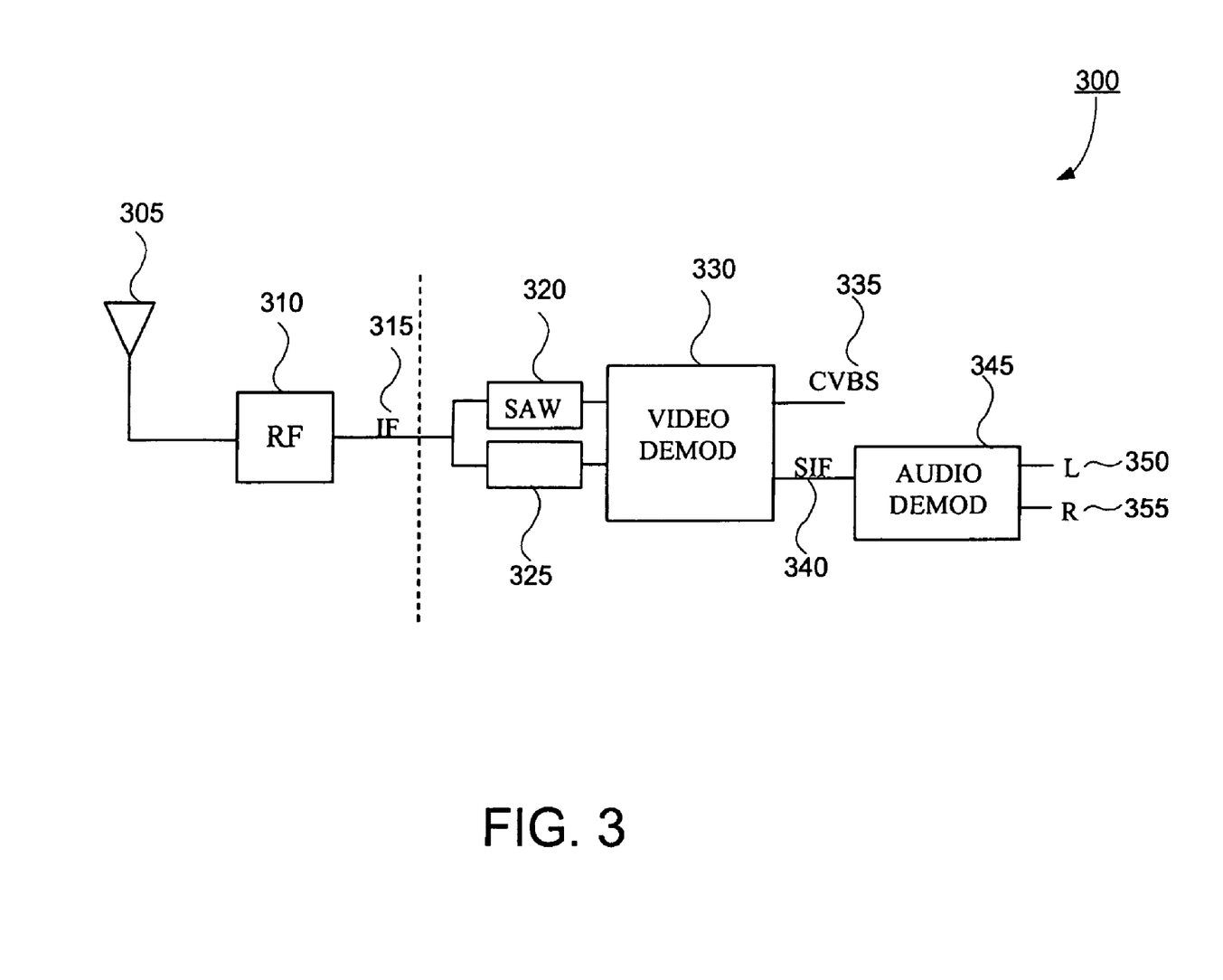
FIG. 3 illustrates a video decoder to separate an audio/video signal into a composite video signal and a second intermediate frequency for audio signal.

FIG. 3 illustrates a video decoder to separate an audio/video signal into a composite video signal and a second intermediate frequency for audio signal. FIG. 3 includes antenna 305 coupled with RF tuner 310. RF tuner 310 is then coupled with SAW filters 320 which output to video demodulator 330. The video demodulator outputs a CVBS signal 335 and also outputs an SIF signal 340 to an audio demodulator 345, which in this example outputs a left channel signal 350 and right channel signal 355.

Referring to FIG. 3, antenna 305 receives a modulated signal and outputs it to RF tuner 310. RF tuner 310 receives the modulated signal and brings it down to IF, such as IF signal 315. A common IF signal 315 is at 44 MHz and may contain video and audio information. Example modulated signals received by antenna 305 are tuner bands such as VHF frequencies between 30 and 300 megahertz and UHF frequencies between 300 and 3,000 megahertz. In the United States, VHF may be sent over television channels 2-13 and UHF initially comprised channels 14-83, where each channel has 6 MHz bandwidth.

RF tuner 310 selects a channel and tunes it to a constant 44 MHz IF signal 315. IF signal 315 contains video and audio components. IF signal 315 is output from RF tuner 310 and input to SAW filters 320 where it is filtered and then sent to demodulator 330.

Video demodulator 330 separates the signal into video and the audio sections and demodulates the signal down to a baseband frequency. Video demodulator 330 may output composite video 335 and an SIF 340 signal. SIF 340 audio signal is then input into audio demodulator 345 which may then output channel audio signals such as left channel 350 and right channel 355. An embodiment may incorporate the audio functionality illustrated in FIG. 3 with hardware or methods conventionally used for video signals.

Figure 4:
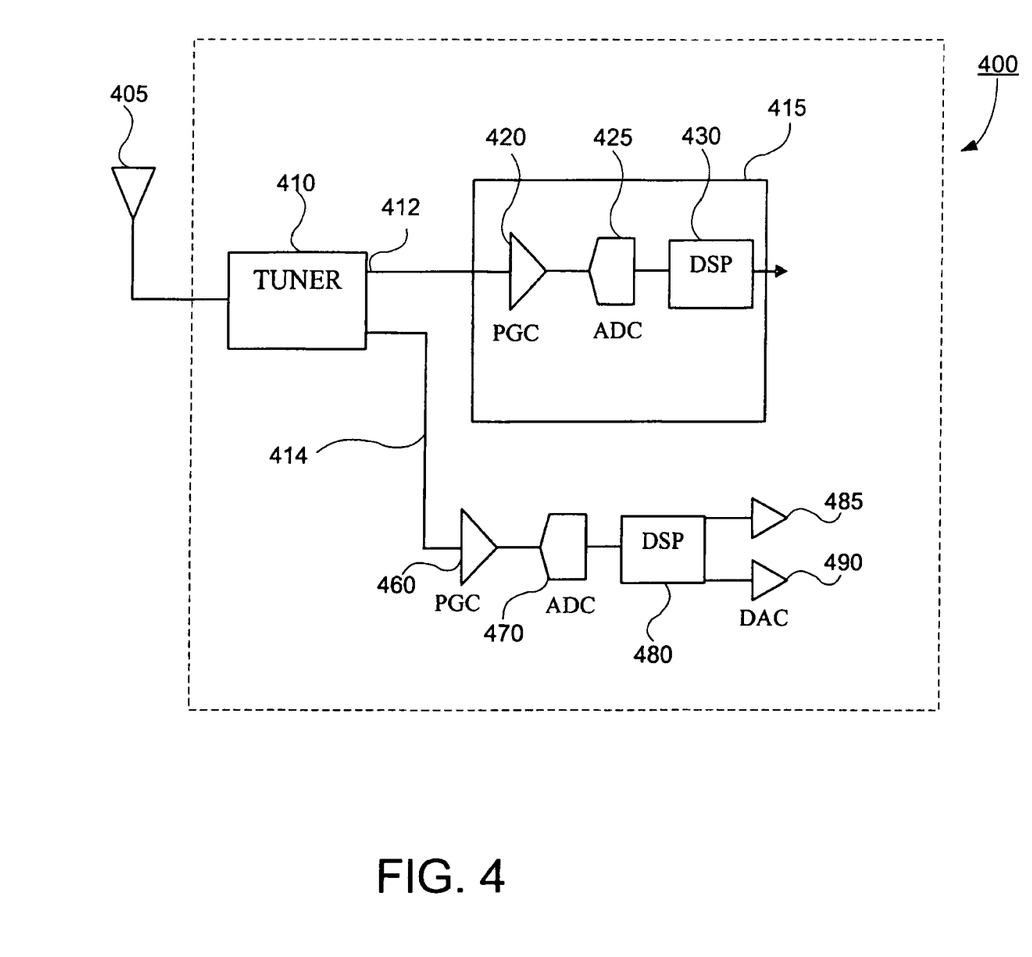
FIG. 4 illustrates a video decoder to separate an audio/video signal and to convert the audio signal into the digital domain for processing.

FIG. 4 illustrates a video decoder 400 to separate an audio/video signal and to digitize the audio signal for processing. Video decoder 400 receives an audio/video signal from antenna 405 and inputs it to tuner 410 to separate the audio and video components of the signal. The tuner 410 generates the video signal 412 and the audio signal 414 that it provides to PGC 420 and 460, respectively.

The video signal 412 output from tuner 410 is input to PGC 420. From PGC 420, the signal is sent to an analog to digital converter 425 and digital signal processing circuitry 430. The PGC 420 provides signal level adjustment to compensate for different signal levels. The ADC 425 digitizes the analog video signal received from PGC 420 and outputs the digital video signal to DSP circuitry 430 for signal processing.

In an embodiment, the audio signal 414 is output from tuner 410 and input to corresponding audio circuitry. The audio signal 414 is input to PGC 460. From PGC 460, the signal is sent to an analog to digital converter 470 and digital signal processing circuitry 480. The PGC 460 provides signal level adjustment to compensate for different signal levels. The ADC 470 digitizes the analog audio signal received from PGC 460 and outputs the digital audio signal to DSP circuitry 480 for signal processing. In this embodiment, DSP 480 outputs the processed audio signal to digital to analog converters (DACs) which output separate channel signals 485 and 490. In another embodiment the audio signal may be output as a digital signal.

Conventionally, SIF have been handled with a separate audio demodulation chip or circuitry. In an embodiment, the audio functionality is integrated into a video demodulator and hardware is re-used. The present embodiment also converts the audio/video signal into the digital domain for processing to maintain signal quality.

Figure 5:
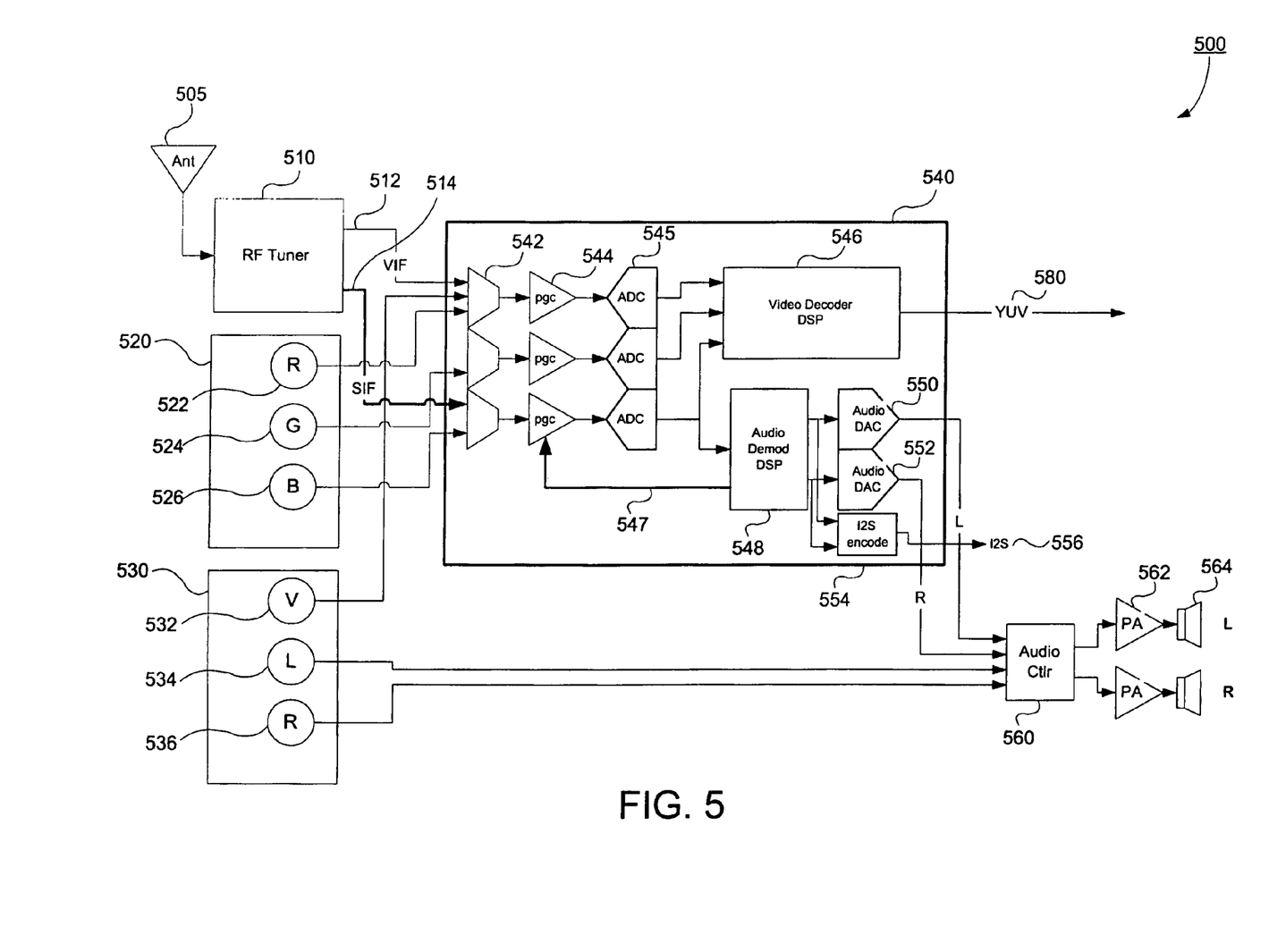
FIG. 5 illustrates a video decoder with integrated audio intermediate frequency demodulation.

FIG. 5 illustrates a video decoder 540 with integrated audio intermediate frequency demodulation. Antenna 505 receives broadcast video signals and outputs them to RF tuner 510. In an embodiment tuner 510 may be an RF and an IF tuner, but is not so limited. For example, RF tuner 510 may output composite video. In the present example, RF tuner 510 outputs a video IF (VIF) signal 512 and an SIF signal 514 to video decoder 540.

FIG. 5 shows some example sources of analog video signals to output to circuitry 540, but is not limited to these examples. For example, block 520 may represent a personal computer, a set-top box, a DVD player, etc. and block 530 may be a DVD player, VCR or other analog video signal source. Block 520 and block 530 are not limited to these devices.

Block 530 is used to show a component video source and is represented with a red video signal 522, a green video signal 524, and a blue video signal 526. These component video signals may be any other component video signals such as YPbPr, and the like. Block 530 represents any device that may be a composite video source. Referring to FIG. 5, block 530 provides a left audio channel 534 and a right audio channel 536 that may go directly to an audio controller.

Circuitry 540 receives analog signals at an input multiplexer 542. From there, the analog signals are input to PGCs 544. From PGC 544, the signal is sent to an ADC 545 and digital signal processing circuitry such as video decoder DSP 546 or an audio demodulator such as audio demodulator DSP 548. In an embodiment, audio demodulator DSP 548 is a broadcast television systems committee audio demodulator (BTSC), but it may be an FM audio demodulator, an A2 audio demodulator, or any other audio demodulator as needed. The PGCs 544 provides signal level adjustment to compensate for different signal levels. The ADCs 545 digitizes the analog signal received from PGC 544 and outputs the digital signal to circuitry for signal processing, decoding or demodulation.

In an embodiment, one or more of the ADCs 545 may digitize audio and video signals. For example, since the circuitry 540 has multiple signals paths with multiple PGCs 544 and ADCs 545 to accommodate component signal inputs, then for a composite signal input the audio may be processed through one of the signal paths. PGCs 544 and ADCs 545 may be used for both audio and video in other ways however, and embodiments are not restricted to the current example.

Referring to FIG. 5, ADCs 545 outputs digital video to video decoder DSP 546 and digital audio to audio demodulator DSP 548. Video decoder DSP 546 may output a signal for a display device. In the present example, the output video signal is a YUV signal 580 with 4:2:2 data and may be output for more processing and output to a display (not shown). The audio demodulator DSP 548 may output audio signals to be converted to analog format in audio DACs 550 and 552 or may output a digital signal such as I2S 554, where I2S is a standard digital audio format often used for chip to chip communications of digital audio signals.

In the embodiment shown in FIG. 5, audio demodulator DSP 548 outputs a feedback control 547 to at least one of the PGCs 544. Although the present example illustrates the feedback control to one PGC 544, other embodiments are not so limited. The feedback control may adjust the PGCs 544 for audio signals since the audio signals may have a different range of voltage, or other characteristics, than the video signals.

For example, video signals may currently range from half a volt to two volts. And audio signals may range from 0.1 volt to 2 volts. Therefore ADCs 545 may require a wider range and more control for the audio signals. Although increased speed, resolution, or other ADC characteristics may consume more silicon space, by re-using an ADC for video and audio signals, silicon space is still conserved overall.

In this embodiment a signal path comprising a PGC 544 and an ADC 545 is used for both audio and video and the audio signal path has a feedback control 547 to adjust the PGC 544 for the differing audio signal levels. An embodiment may have a larger variation in the video signals and may have the feedback control, similar to feedback control 547, originating from the video decoder DSP 546 or may have multiple feedback controls for both audio and video for a system with signal paths being re-used for audio and video signals.

Figure 6:
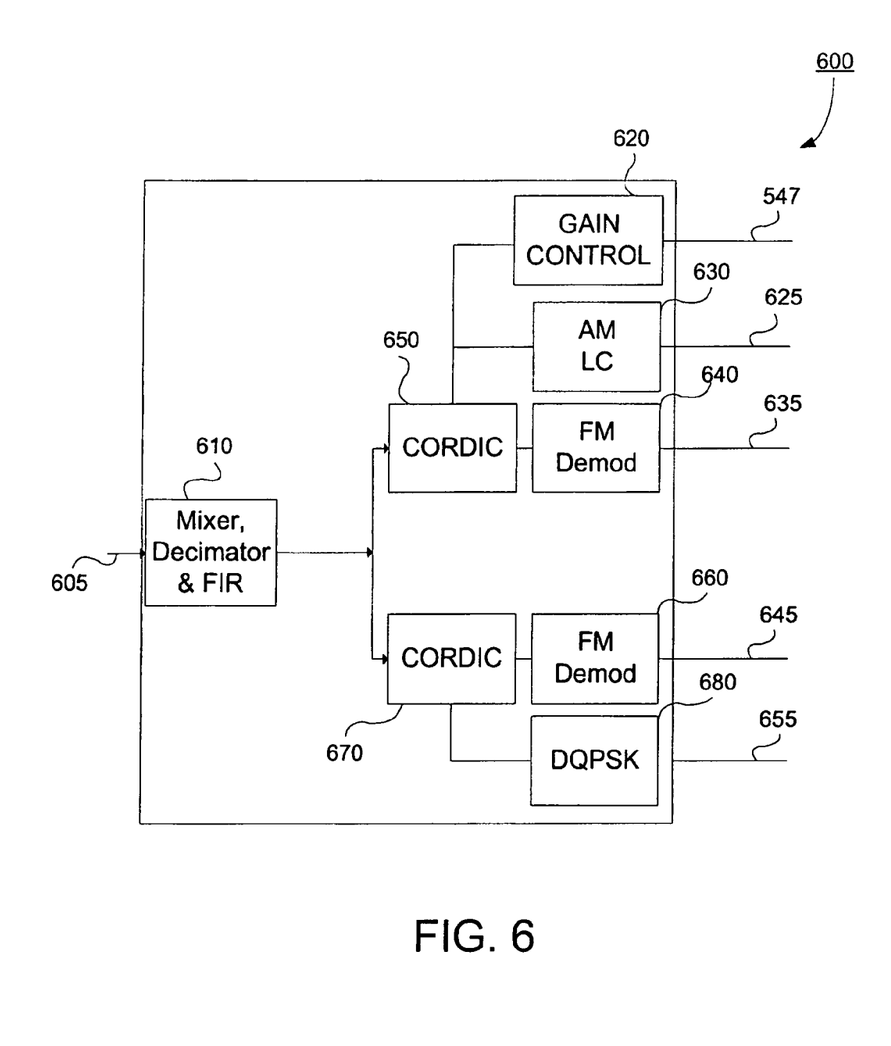
FIG. 6 illustrates an audio demodulator in a video decoder with a gain control to feedback to upstream circuitry of an analog to digital converter.

FIG. 6 illustrates an audio demodulator 600 with a gain control 620 to feedback signal 547 to upstream circuitry of an ADC. Audio demodulator 600 may be a portion of audio demodulator DSP 548 in FIG. 5.

An embodiment may comprise a video decoder with a programmable gain controller, an analog to digital converter coupled with the programmable gain controller, the converter to digitize audio and video information, and an audio demodulator coupled with the analog to digital converter and the programmable gain controller, the audio demodulator to control the programmable gain controller.

The present embodiment may further comprise a plurality of programmable gain controllers and a plurality of analog to digital converters. In the present embodiment, at least one of the plurality of analog to digital converters may convert a video signal while one of the plurality of analog to digital converters converts an audio signal.

Referring to FIG. 6, audio demodulator 600 receives an audio signal 605. In the present example, the audio signal is sent through initial processing at block 610. Example processing at block 610 may be mixing, decimating, filtering, and the like. From block 610, the signal may be sent to coordinate rotation digital computer (CORDIC) blocks 650 and 670. CORDIC 670 outputs a signal to FM demodulation block 660 and an encoder such as differential quadrature phase shift keying (DQPSK) block 680.

CORDIC 650 outputs to FM demodulation block 640, AM level control block 630 and gain control block 620. In an embodiment, gain control block 620 is an AM pass filter. Gain control block 620 may measure the amplitude of the output signal from CORDIC 650 and output a feedback control signal 547 to adjust an upstream signal, for example feedback control 547 may adjust a PGC such as 544 in FIG. 5.

An embodiment may include a BTSC audio demodulator. As an example, in BTSC embodiment the gain control block 620 may measure amplitude out of CORDIC 650, for example the measurement may be a peak amplitude measurement, an RMS measurement, low pass filtering based on amplitude, etc. Generally, any signal characteristic that allows gain measurement may be used, embodiments are not limited to the embodiment illustrated in FIG. 6. In an embodiment, the amplitude measurement may be compared to a reference value to then adjust gain control with feedback control signal 547.

An embodiment may be an apparatus comprising a means for converting a video signal from analog to digital, a means for converting an audio signal from analog to digital, a means for demodulating the audio signal, and a means for amplifying the audio signal before it is converted from analog to digital, the amplifying means also for receiving from the demodulating means a control signal to adjust the audio signal level. The present embodiment may further comprise a means for converting a video signal concurrently with the audio signal.

In an embodiment apparatus, the demodulating means may further comprise means for demodulating a broadcast television systems committee signal. In an embodiment apparatus, the audio signal may be a second intermediate frequency for audio signal.

An embodiment may comprise an article of machine-readable medium containing instructions that, when executed, cause a machine to convert a video signal with an analog to digital converter in a video decoder, convert an audio signal with the analog to digital converter, demodulate the audio signal with an audio demodulator, and amplify the audio signal with a programmable gain amplifier before it is converted in the analog to digital converter, the programmable gain amplifier to receive a control signal from the audio demodulator to adjust the audio signal level.

In the present embodiment, may further contain instructions that cause the machine to convert a video signal with at least one other analog to digital converter concurrently with the audio signal. In an embodiment, the machine may demodulate a broadcast television systems committee signal. In an embodiment, the machine may convert a second intermediate frequency for audio signal from analog to digital.

Figure 7:
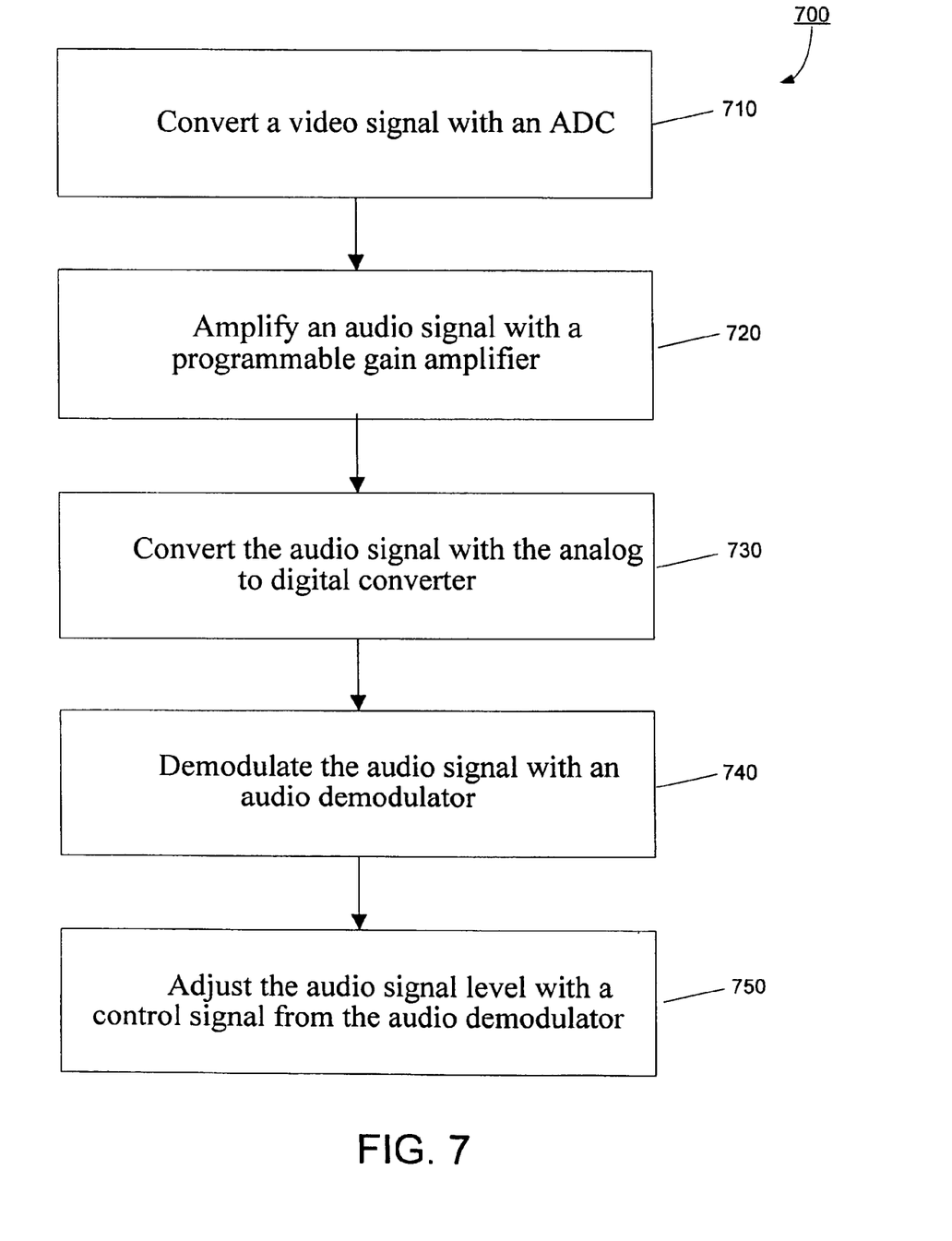
FIG. 7 illustrates a method to use an analog to digital converter for both audio and video signal digitization.

FIG. 7 illustrates a method 700 to digitize both audio and video signal with an ADC. An embodiment may be a method comprising converting a video signal with an analog to digital converter in a video decoder as shown in block 710, amplifying an audio signal with a programmable gain amplifier in block 720, converting the audio signal with the analog to digital converter in block 730, demodulating the audio signal with an audio demodulator in block 740, and adjusting the audio signal level with the programmable gain amplifier by use of a control signal from the audio demodulator in block 750. The present embodiment may further comprise converting a video signal with at least one other analog to digital converter concurrently with the audio signal.

In the present embodiment, the demodulator may be a broadcast television systems committee demodulator. In an embodiment method, the audio signal may be a second intermediate frequency for audio signal.

The present disclosure may be embodied in other specific forms without departing from its spirit or essential characteristics. The described embodiments are to be considered in all respects only as illustrative instead of restrictive or limiting. Therefore, the scope of the disclosure is indicated by the appended claims rather than by the foregoing description. All changes, modifications, and alterations that come within the meaning, spirit, and range of equivalency of the claims are to be embraced as being within the scope of the appended claims.

The invention claimed is:

1. A video decoder comprising:
a tuner configured to separate a signal from an antenna into audio information and video information and to provide each of the audio information and the video information as a separate output signal to an input multiplexer;
a plurality of programmable gain controllers having a direct connection to the input multiplexer;
a plurality of analog to digital converters, where each of the plurality of analog to digital converters has a direct connection to a corresponding one of the plurality of programmable gain controllers, wherein each of the plurality of analog to digital converters can digitize the audio information and the video information;
an audio demodulator coupled with at least a first of the plurality of analog to digital converters and a first corresponding one of the plurality of programmable gain controllers;
a video decoder coupled with at least a second of the plurality of analog to digital converters and a second corresponding one of the plurality of programmable gain controllers;
a feedback loop from the audio demodulator to control the first corresponding one of the plurality of programmable gain controllers; and
a feedback loop from the video decoder to control the second corresponding one of the plurality of programmable gain controllers.

2. The video decoder of claim 1 where the audio demodulator is a broadcast television systems committee demodulator.

3. The video decoder of claim 1, wherein the tuner comprises a radio frequency (RF) tuner.

4. The video decoder of claim 1, wherein the input multiplexer comprises a plurality of multiplexers to receive the separate output signals from the tuner, where each of the plurality of multiplexers is coupled with a corresponding one of the plurality of programmable gain controllers, wherein each of the plurality of multiplexers can provide one of the audio information and the video information to the corresponding one of the plurality of programmable gain controllers.

5. The video decoder of claim 1, further comprising a plurality of digital to analog converters coupled between the audio demodulator and an audio controller.

6. The video decoder of claim 1, further comprising an I2S encoder.

7. A method comprising:
separating a signal from an antenna into an audio signal and a video signal with a tuner and providing each of the audio signal and the video signal as a separate output to an input multiplexer;
digitizing the video signal with a first analog to digital converter while concurrently digitizing the audio signal with a second analog to digital converter;
adjusting the video signal with a first programmable gain amplifier responsive to a control signal from a video decoder wherein the first programmable gain amplifier receives the video signal directly from the input multiplexer, and wherein the first analog to digital converter receives the video signal directly from the first programmable gain amplifier;
decoding the video signal with the video decoder;
amplifying and adjusting the audio signal with a second programmable gain amplifier responsive to a control signal from an audio demodulator, wherein the second programmable gain amplifier receives the audio signal directly from the input multiplexer, and wherein the second analog to digital converter receives the audio signal directly from the second programmable gain amplifier; and
demodulating the audio signal with the audio demodulator.

8. The method of claim 7 where the audio demodulator is a broadcast television systems committee demodulator.

9. The method of claim 7 where the audio signal is a second intermediate frequency for audio signal.

10. The method of claim 7 further comprising converting the audio signal to analog format in an audio digital to analog converter.

11. The method of claim 7, further comprising encoding the demodulated audio signal as an I2S signal.

12. The method of claim 7, further comprising sending the demodulated audio signal to a digital to analog converter.

13. An apparatus comprising:
a means for receiving a video signal at an input multiplexer:
a means for converting the video signal from analog to digital;
a means for decoding the video signal;
a means for receiving an audio signal at the input multiplexer;
a means for converting the audio signal from analog to digital;
a means for demodulating the audio signal;
a means for amplifying the audio signal before it is converted from analog to digital, wherein the means for amplifying the audio signal includes receiving from the means for demodulating at least one audio control signal to adjust the audio signal level;
a means for passing the audio signal directly from the input multiplexer to the means for amplifying the audio signal;
a means for passing the audio signal directly from the means for amplifying the audio signal to the means for converting the audio signal from analog to digital;
a means for adjusting the video signal before it is converted from analog to digital, wherein the means for adjusting the video signal includes receiving from the means for decoding at least one video control signal;
a means for passing the video signal directly from the input multiplexer to the means for adjusting the video signal; and a means for passing the video signal directly from the means for adjusting the video signal to the means for converting the video signal from analog to digital.

14. The apparatus of claim 13 comprising a means for converting a video signal concurrently with the audio signal.

15. The apparatus of claim 13 where the demodulating means further comprises means for demodulating a broadcast television systems committee signal.

16. The apparatus of claim 13 where the audio signal is a second intermediate frequency for audio signal.

17. The apparatus of claim 13, further comprising a means for receiving an input signal and, using a tuner, separating the input signal into the video signal and the audio signal.

18. A method comprising:
   a tuner separating a signal from an antenna into a video signal and an audio signal;
   an analog to digital converter converting the video signal;
   the analog to digital converter converting the audio signal;
   an audio demodulator demodulating the audio signal;
   a first programmable gain amplifier receiving the audio signal directly from an input multiplexer and amplifying the audio signal immediately before it is converted in the analog to digital converter, the first programmable gain amplifier to receive a control signal from the audio demodulator to adjust the audio signal level; and
   a second programmable gain amplifier receiving the video signal directly from the input multiplexer and adjusting the video signal immediately before it is converted in the analog to digital converter, the second programmable gain amplifier to receive a second control signal from video decoder.

19. The method of claim 18, further comprising at least one other analog to digital converter converting the video signal concurrently with the audio signal.

20. The method of claim 18, further comprising demodulating a broadcast television systems committee signal.

21. The method of claim 18, further comprising converting a second intermediate frequency for audio signal from analog to digital.

\* \* \* \* \*